(12) United States Patent
Yamada et al.

(10) Patent No.: US 11,608,886 B2
(45) Date of Patent: Mar. 21, 2023

(54) SELECTOR UNIT

(71) Applicants: TOYOTA JIDOSHA KABUSHIKI KAISHA, Toyota (JP); SUBARU CORPORATION, Tokyo (JP)

(72) Inventors: Naoki Yamada, Okazaki (JP); Haruhisa Tokunaga, Okazaki (JP); Junya Ono, Nagoya (JP); Naofumi Ota, Tokyo (JP)

(73) Assignees: TOYOTA JIDOSHA KABUSHIKI KAISHA, Toyota (JP); SUBARU CORPORATION, Tokyo (JP)

(*) Notice: Subject to any disclaimer, the term of this patent is extended or adjusted under 35 U.S.C. 154(b) by 0 days.

(21) Appl. No.: 17/474,291

(22) Filed: Sep. 14, 2021

(65) Prior Publication Data

US 2022/0120345 A1    Apr. 21, 2022

(30) Foreign Application Priority Data

Oct. 15, 2020  (JP) .............................. JP2020-173902

(51) Int. Cl.
*F16H 59/12*     (2006.01)
*F16H 59/08*     (2006.01)

(52) U.S. Cl.
CPC ....... *F16H 59/12* (2013.01); *F16H 2059/081* (2013.01)

(58) Field of Classification Search
CPC G05G 1/10; G05G 1/082; G05G 1/08; G05G 1/087; F16H 2059/081; F16H 59/12; F16H 59/08
USPC ....................................................... 74/473.3
See application file for complete search history.

(56) References Cited

U.S. PATENT DOCUMENTS

| | | | |
|---|---|---|---|
| 6,601,685 B2* | 8/2003 | Nagasaka | B60K 37/06 180/315 |
| 9,254,745 B2* | 2/2016 | Tokumo | F16H 59/08 |
| 9,291,259 B2* | 3/2016 | Watanabe | F16H 59/08 |
| 10,352,440 B2* | 7/2019 | Fribus | B60R 25/252 |

(Continued)

FOREIGN PATENT DOCUMENTS

| | | | | |
|---|---|---|---|---|
| DE | 102007029594 A1 * | 1/2009 | | B60K 37/06 |
| JP | 2012-086828 A | 5/2012 | | |

OTHER PUBLICATIONS

U.S. Appl. No. 17/222,615, filed Apr. 5, 2021, Ono, Hiroki et al.

*Primary Examiner* — William C Joyce
*Assistant Examiner* — Gregory Robert Weber
(74) *Attorney, Agent, or Firm* — Dinsmore & Shohl LLP

(57) ABSTRACT

A selector unit includes a protruding portion and a dial member. The dial member is configured to be displaced between an initial position and a depressed position along an axial direction of the protruding portion, and to be rotationally operable in a circumferential direction when depressed to the depressed position. An offset angle at a rearward side when the dial member is at the initial position is greater than the offset angle at a forward side when the dial member is at the depressed position. The offset angle means an angle between an extended line obtained by extending an upper face of the protruding portion outwards in a radial direction and a tangential line in contact with both the upper face of the protruding portion and an upper face of the dial member, in a section including a rotation axis of the dial member.

9 Claims, 3 Drawing Sheets

(56) References Cited

U.S. PATENT DOCUMENTS

| | | | |
|---|---|---|---|
| 10,596,908 B1* | 3/2020 | Baek | B60K 37/06 |
| 10,731,750 B2* | 8/2020 | Wang | F16H 61/22 |
| 10,802,619 B2* | 10/2020 | Fischer | G05G 9/047 |
| 10,890,251 B2* | 1/2021 | Beattie | F16H 61/24 |
| 11,014,450 B2* | 5/2021 | Keenan | F16H 59/02 |
| 11,168,889 B2* | 11/2021 | Ibrahim | G05G 1/082 |
| 2006/0037424 A1* | 2/2006 | Pickering | F16H 59/08 |
| | | | 74/473.3 |
| 2018/0172145 A1* | 6/2018 | Farges | F16H 59/10 |
| 2019/0120370 A1* | 4/2019 | Dimig | F16H 59/12 |

* cited by examiner

SELECTOR UNIT

CROSS-REFERENCE TO RELATED APPLICATION

This application claims priority to Japanese Patent Application No. 2020-173902 filed on Oct. 15, 2020, incorporated herein by reference in its entirety.

BACKGROUND

1. Technical Field

The technology disclosed in the present disclosure relates to a dial (i.e., a rotary) selector unit operated by a user, and more particularly relates to a selector unit installed in a vehicle.

2. Description of Related Art

Japanese Unexamined Patent Application Publication No. 2012-086828 (JP 2012-086828 A) discloses a dial selector unit installed in a vehicle. This selector unit is provided with a protruding portion that protrudes inward into a vehicle cabin of the vehicle, and a dial member that surrounds the protruding portion in the circumferential direction. The dial member is capable of displacement along the axial direction of the protruding portion, and is configured to be rotationally operated along the circumferential direction of the protruding portion in a state of being depressed along the axial direction of the protruding portion.

SUMMARY

With this kind of selector unit, a user (i.e., the driver of the vehicle or some other occupant) may place their hand on the selector unit for a continued period of time, even when there is no need to operate the dial member. In this case, the hand of the user placed on the selector unit is supported by an upper face of the protruding portion, thereby suppressing the dial member from being unintentionally erroneously operated. Particularly, the greater the height of the protruding portion relative to the height of the dial member (i.e., amount of protruding) is, the more effectively an erroneous operation of the dial member can be suppressed. However, simply using such a configuration leads to problems such as a problem that the protruding portion excessively protrudes inward into the vehicle cabin, and a problem that the height of the dial member is limited to be so low that operability of the dial member becomes poor.

In light of the above, the present disclosure provides technology by which both improved operability and suppression of erroneous operations in a dial selector unit can be realized.

The technology disclosed in the present disclosure is manifested as a dial selector unit installed in a vehicle. The selector unit according to an aspect of the disclosure includes a protruding portion that protrudes inward into a vehicle cabin of the vehicle, and a dial member that is positioned on an outer side of the protruding portion in a radial direction, and that surrounds the protruding portion in a circumferential direction. The dial member is configured to be displaced between an initial position and a depressed position along an axial direction of the protruding portion, and to be rotationally operable in the circumferential direction when depressed to the depressed position. An offset angle at a rearward side in a vehicle front-rear direction when the dial member is at the initial position is greater than the offset angle at a forward side in the vehicle front-rear direction when the dial member is at the depressed position. The term offset angle as used here means an angle between an extended line obtained by extending an upper face of the protruding portion outwards in the radial direction and a tangential line that is in contact with both the upper face of the protruding portion and an upper face of the dial member, in a section including a rotation axis of the dial member.

Selector switches operated by a user are normally situated on the forward side in the vehicle front-rear direction relative to the user. According to such a position, when the user places a hand on the selector unit, the palm (particularly, the ball of the little finger and the wrist) of the user may unintentionally come into contact with the dial member. The portion that the palm of the user primarily comes into contact with at this time is the portion of the dial member situated on the user side, i.e., the portion situated at the rearward side in the vehicle front-rear direction. Accordingly, at the portion situated at the rearward side in the vehicle front-rear direction, the height of the dial member is relatively low as compared to that of the protruding portion even when the dial member is at the initial position, and thus erroneous operation of the dial member can be suppressed.

On the other hand, when the user intentionally operates the selector unit, the user often operates the dial member using the fingertip. At this time, the portion that the fingertip of the user primarily comes into contact with is the portion of the dial member that is situated on the opposite side from the user, i.e., the portion situated at the forward side in the vehicle front-rear direction. Accordingly, at the portion situated at the forward side in the vehicle front-rear direction, the height of the dial member is not so small as compared to that of the protruding portion even when the dial member is at the depressed position, and accordingly operability of the dial member can be improved. In other words, when the dial member is at the depressed position, the height of the dial member at the portion situated at the forward side in the vehicle front-rear direction is shorter than but close to the height of the protruding portion.

In the selector unit according to the above aspect, in the section, the upper face of the dial member situated at the rearward side in the vehicle front-rear direction may incline such that a distance between the upper face of the dial member and the extended line increases toward a radially outer side.

In the selector unit according to the above aspect of the present disclosure, when an inclination angle is defined as an angle between the extended line and the upper face of the dial member in the section, the inclination angle at the rearward side in the vehicle front-rear direction may be equal to or greater than the offset angle at the rearward side in the vehicle front-rear direction.

In the selector unit according to the above aspect of the present disclosure, the inclination angle at the rearward side in the vehicle front-rear direction may be equal to or greater than the offset angle at the rearward side in the vehicle front-rear direction when the dial member is at the depressed position.

In the selector unit according to the above aspect of the present disclosure, in the section, the upper face of the dial member situated at the forward side in the vehicle front-rear direction may have a flat face parallel to the extended line.

The selector unit according to the above aspect of the present disclosure may further include at least one biasing member that biases the dial member toward the initial position.

In the selector unit according to the above aspect of the present disclosure, the selector unit may be a selector unit that is operated by a driver of the vehicle, and that is disposed forward of the driver in the vehicle front-rear direction.

In the selector unit according to the above aspect of the present disclosure, the selector unit may be disposed in a center console of the vehicle.

In the selector unit according to the above aspect of the present disclosure, the offset angle may be an angle between the extended line and the tangential line that is in contact with both a perimeter of the outer perimeter of the upper face of the protruding portion and a perimeter of the upper face of the dial member.

From the above, in the selector unit disclosed in the present disclosure, when the offset angle is defined as above, the offset angle at the rearward side in the vehicle front-rear direction when the dial member is at the initial position is greater than the offset angle at the forward side in the vehicle front-rear direction when the dial member is at the depressed position. According to this configuration, both improved operability and suppression of erroneous operations can be realized in the dial selector unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the present disclosure, in a section, an upper face of a dial member situated at a rearward side in a vehicle front-rear direction may incline such that a distance between the upper face of the dial member and an extended line increases toward a radially outer side. The extended line is obtained by extending an upper face of the protruding portion outwards in the radial direction. According to this configuration, a palm of a user can be restrained from unintentionally coming into contact with the dial member more effectively.

In the embodiment, when an inclination angle is defined as an angle between the extended line and the upper face of the dial member in the section, the inclination angle at the rearward side in the vehicle front-rear direction may be equal to or greater than the offset angle at the rearward side in the vehicle front-rear direction. According to this configuration, the palm of the user can be restrained from unintentionally coming into contact with the dial member even more effectively.

In an embodiment of the present disclosure, in the section, the upper face of the dial member situated at the forward side in the vehicle front-rear direction may have a flat face parallel to the extended line. According to this configuration, the height at an outer peripheral face of the dial member is made great at the forward side in the vehicle front-rear direction, whereby operability of a selector unit can be further improved.

In an embodiment of the present disclosure, the selector unit may further include at least one biasing member to bias the dial member toward the initial position. In this case, the at least one biasing member may bias the dial member along the axial direction and the circumferential direction of the protruding portion.

In an embodiment of the present disclosure, the selector unit may be a selector unit that is operated by a driver of the vehicle, and that is disposed forward of the driver in the vehicle front-rear direction. In this case, the selector unit may be operated by the driver to switch the direction of travel of the vehicle. Note however, that the selector unit is not limited to being operated by the driver, and may be operated by another occupant of the vehicle, as another embodiment.

In an embodiment of the present disclosure, the selector unit may be disposed in a center console of the vehicle. Note however, that the selector unit may be disposed at other portions within a vehicle cabin, such as an instrument panel, a dashboard, a door panel, or the like, of the vehicle, as other embodiments.

Figure 1:
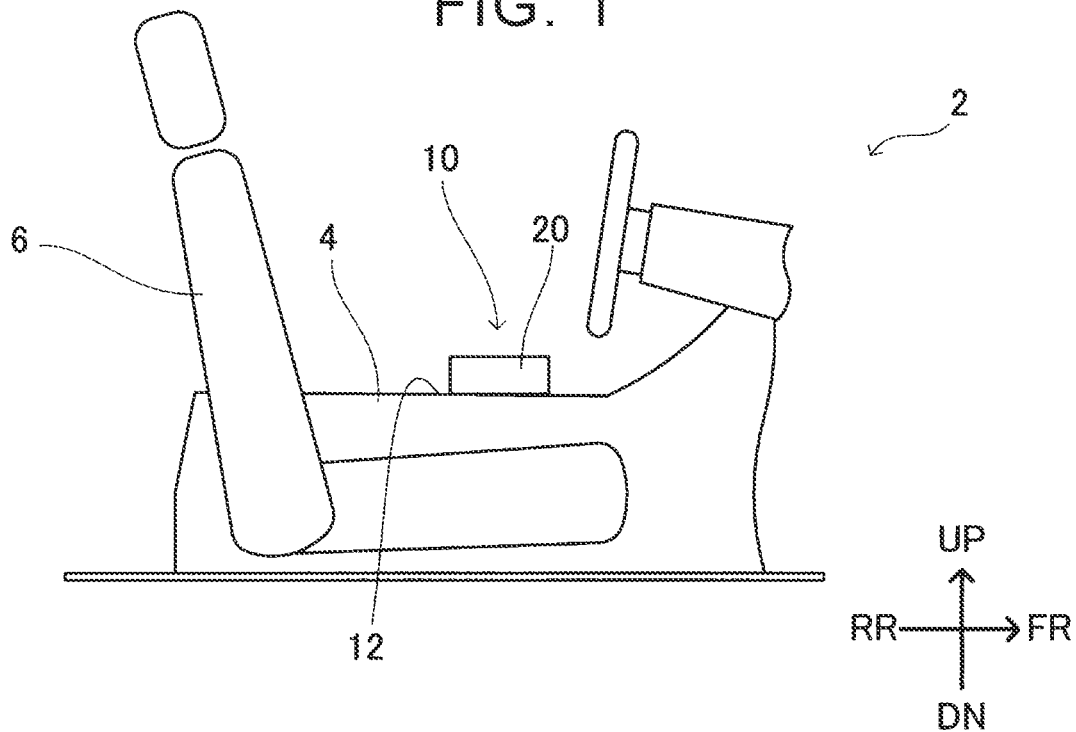
FIG. 1 illustrates a vehicle 2 that employs a selector unit 10 according to an embodiment.

A selector unit 10 according to an embodiment will be described with reference to the drawings. The selector unit 10 according to the present embodiment is an operation unit that is operated by a user, and more particularly is a dial (rotary) selector unit. The selector unit 10 can be employed in a vehicle cabin of a vehicle 2, as illustrated in FIG. 1, although this is not limiting in particular. The vehicle 2 according to the present embodiment is a vehicle that travels over a road surface (a so-called automobile), and may be a vehicle of various types, such as gasoline or diesel engine vehicles, electric vehicles, hybrid vehicles, fuel cell vehicles, and so forth, for example.

Now, in the drawings, direction FR indicates forward in the front-rear direction (vehicle-length direction) of the vehicle 2, and the direction RR indicates rearward in the front-rear direction of the vehicle 2. Also, the direction LH indicates leftward in the right-left direction (vehicle-width direction) of the vehicle 2, and the direction RH indicates rightward in the right-left direction of the vehicle 2. The direction UP indicates upward in the up-down direction (vehicle-height direction) of the vehicle 2, and the direction DN indicates downward in the up-down direction of the vehicle 2. Note that in the present disclosure, the front-rear direction, the right-left direction, and the up-down direction, of the vehicle 2 may be referred to simply as the front-rear direction, the right-left direction, and the up-down direction, respectively.

The selector unit 10 is provided in a center console 4 of the vehicle 2, and is situated forward of a driver (omitted from illustration) seated in a driver's seat 6. The driver can switch the direction in which the vehicle 2 travels (i.e., forward or reverse), for example, by operating the selector unit 10. Note that the selector unit 10 according to the present embodiment may be disposed at other portions within the vehicle cabin, such as an instrument panel, a dashboard, a door panel, or the like, of the vehicle 2, as other embodiments.

Figure 2:
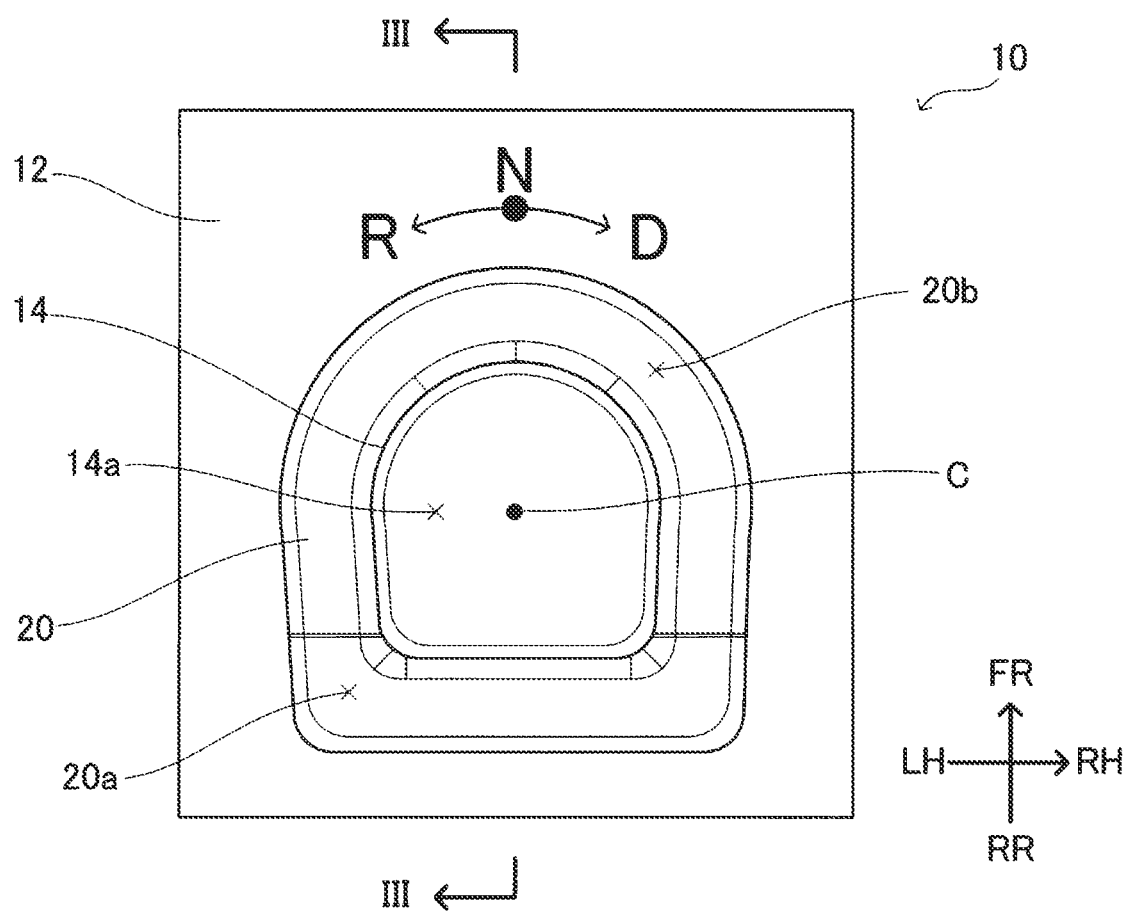
FIG. 2 is a plan view illustrating the selector unit 10.
Figure 3:
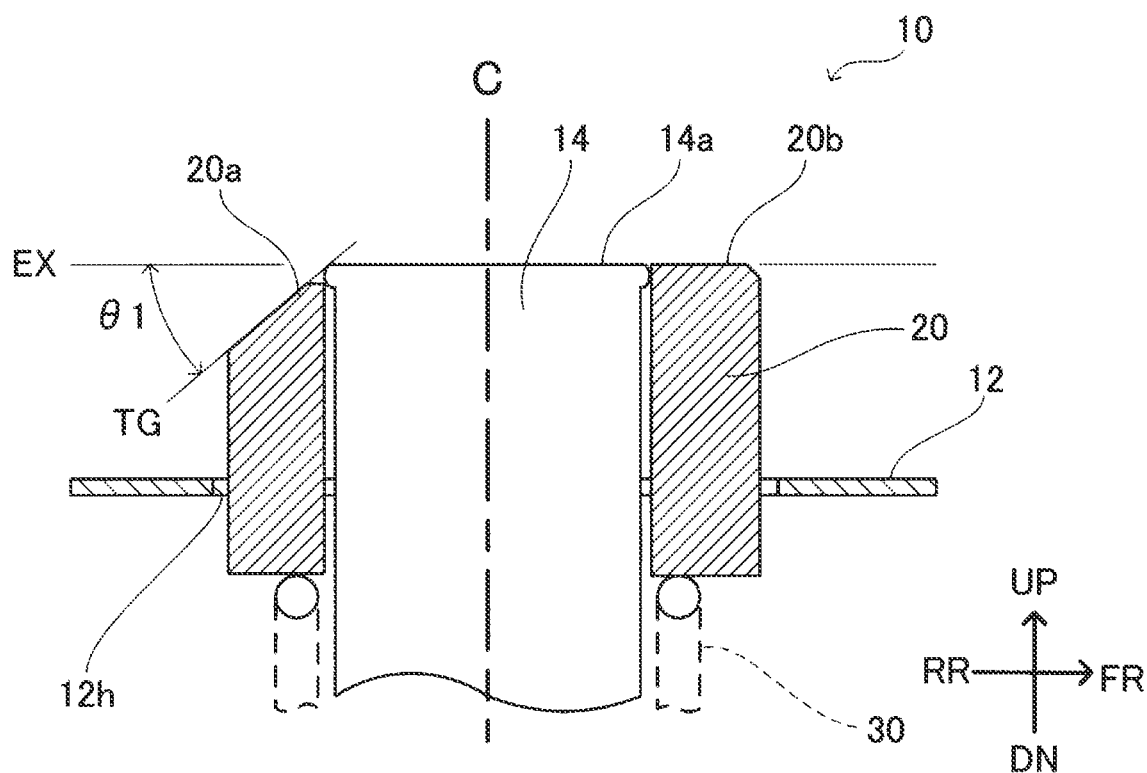
FIG. 3 is a sectional view that is taken along line in FIG. 2 and shows a dial member 20 in an initial position, and that shows a section which includes a rotation axis C of the dial member 20, and particularly a section which is parallel to a front-rear direction of the vehicle 2.
Figure 4:
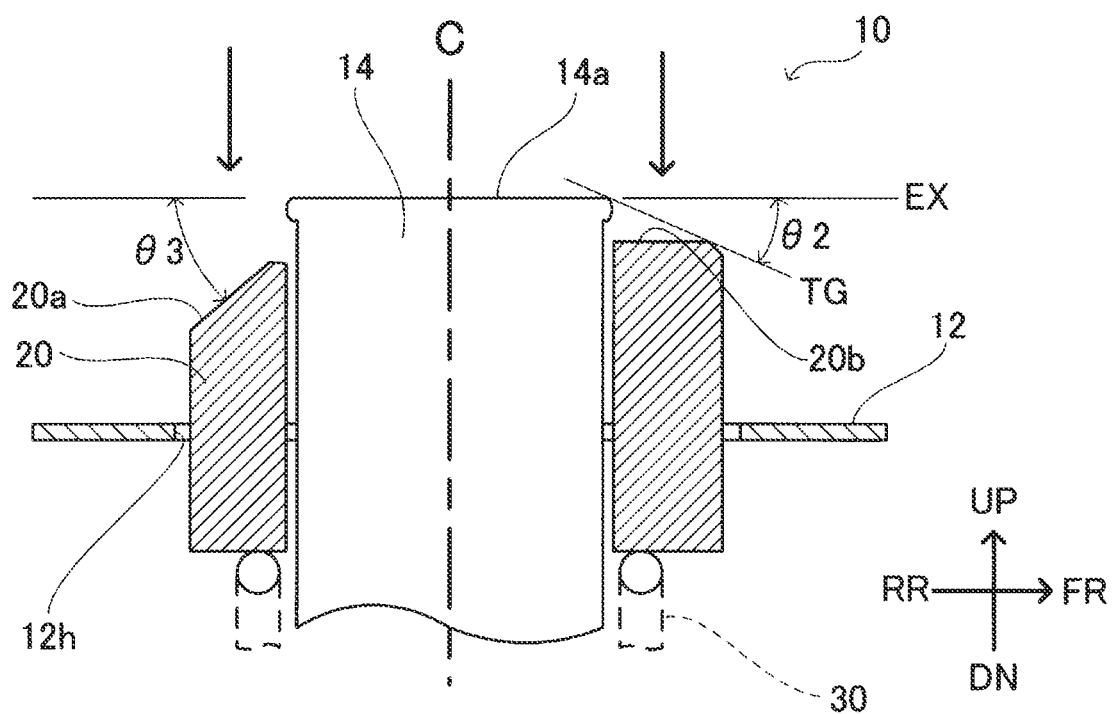
FIG. 4 is a sectional view taken along the same line as in FIG. 3, showing the dial member 20 in a depressed position.

The selector unit 10 is primarily provided with a panel 12, a protruding portion 14, a dial member 20, and a biasing member 30, as illustrated in FIGS. 2 through 4. The panel 12 is a plate-like member, making up part of an interior (more specifically, part of an upper face of the center console 4) of the vehicle 2. The panel 12 according to the present embodiment is made of a resin material, although this is not restrictive. An opening 12h through which the protruding portion 14 and the dial member 20 pass is provided in the panel 12.

The protruding portion 14 protrudes inward into the vehicle cabin. The protruding portion 14 is fixed to the vehicle 2, and has a flat, or substantially flat, upper face 14a on a distal end thereof. The upper face 14a of the protruding portion 14 extends perpendicularly, or substantially perpendicularly, to the axial direction (up-down direction here) of the protruding portion 14. Note however, that the upper face 14a of the protruding portion 14 may be at an angle with respect to the axial direction of the protruding portion 14, as another embodiment. The size and outline shape of the upper face 14a of the protruding portion 14 are not limited in particular, either.

The dial member 20 is situated on the outer side of the protruding portion 14 in the radial direction, and surrounds the protruding portion 14 in the circumferential direction. The dial member 20 is supported by the protruding portion 14, and is configured to be capable of displacement along the axial direction of the protruding portion 14 (the up-down direction here), between an initial position illustrated in FIG. 3 and a depressed position illustrated in FIG. 4. Also, the dial member 20 is configured so as to be capable of being rotationally operated in the circumferential direction of the protruding portion 14 when depressed to the depressed position. That is to say, the dial member 20 is configured so as to be unable to be rotationally operated when the dial member 20 is at the initial position.

In one example of the selector unit 10 according to the present embodiment, when the user rotationally operates the dial member 20 in one direction (direction D in FIG. 2), the direction of travel of the vehicle 2 is set to forward. On the other hand, when the user rotationally operates the dial member 20 in another direction (direction R in FIG. 2), the direction of travel of the vehicle 2 is set to reverse. Here, an axis C in the drawings indicates a rotation axis C of the dial member 20, and the direction in which the rotation axis C extends matches the axial direction of the protruding portion 14.

The biasing member 30 biases the dial member 20 toward the initial position. In one example, the biasing member 30 according to the present embodiment has a coil spring, and biases the dial member 20 in both the axial direction and the circumferential direction of the protruding portion 14. Accordingly, the dial member 20 is configured such that when the user releases the dial member 20, the dial member 20 returns to the initial position, regardless of the position to which the dial member 20 has been operated. Note that the number of biasing members 30 is not limited in particular. One biasing member 30 that biases the dial member 20 toward the initial position is sufficient for the selector unit 10.

An upper face of the dial member 20 is generally sectioned into a portion situated on a rearward side of the dial member 20 in the front-rear direction of the vehicle 2 (hereinafter referred to as "rear-side upper face 20a") and a portion situated on a forward side of the dial member 20 in the front-rear direction of the vehicle 2 (hereinafter referred to as "front-side upper face 20b"). In FIG. 2, the rear-side upper face 20a is a portion linearly extending along the rearward side of the protruding portion 14, and the front-side upper face 20b is a portion extending along the forward side of the protruding portion 14 in a horseshoe-like shape from both edges of the rear-side upper face 20a. The rear-side upper face 20a is a portion that is generally situated at the side of the driver, and the front-side upper face 20b is a portion that is generally situated away from the side of the driver.

The rear-side upper face 20a of the dial member 20 is an inclined face, which inclines downward DN, in the rearward direction RR of the vehicle 2. On the other hand, the front-side upper face 20b is a horizontal (not inclined) face that is parallel to the upper face 14a of the protruding portion 14. Accordingly, an offset angle $\theta 1$ at the rearward side of the vehicle 2 when the dial member 20 is at the initial position (see FIG. 3) is greater than an offset angle $\theta 2$ at the forward side of the vehicle 2 when the dial member 20 is at the depressed position (see FIG. 4). Note that the offset angles $\theta 1$ and $\theta 2$ here are angles formed between an extended line EX extending from the upper face 14a of the protruding portion 14 outward in the radial direction, and tangential lines TG that is in contact with both the upper face 14a of the protruding portion 14 and the upper face 20a (or 20b) of the dial member 20, in a section including the rotation axis C of the dial member 20 (i.e., the sections shown in FIGS. 3 and 4). More specifically, the offset angle in this embodiment is an angle formed between the extended line and tangential line in contact with both of the perimeter of the upper face of the protruding portion and the perimeter of the upper face of the dial member.

Figure 5:
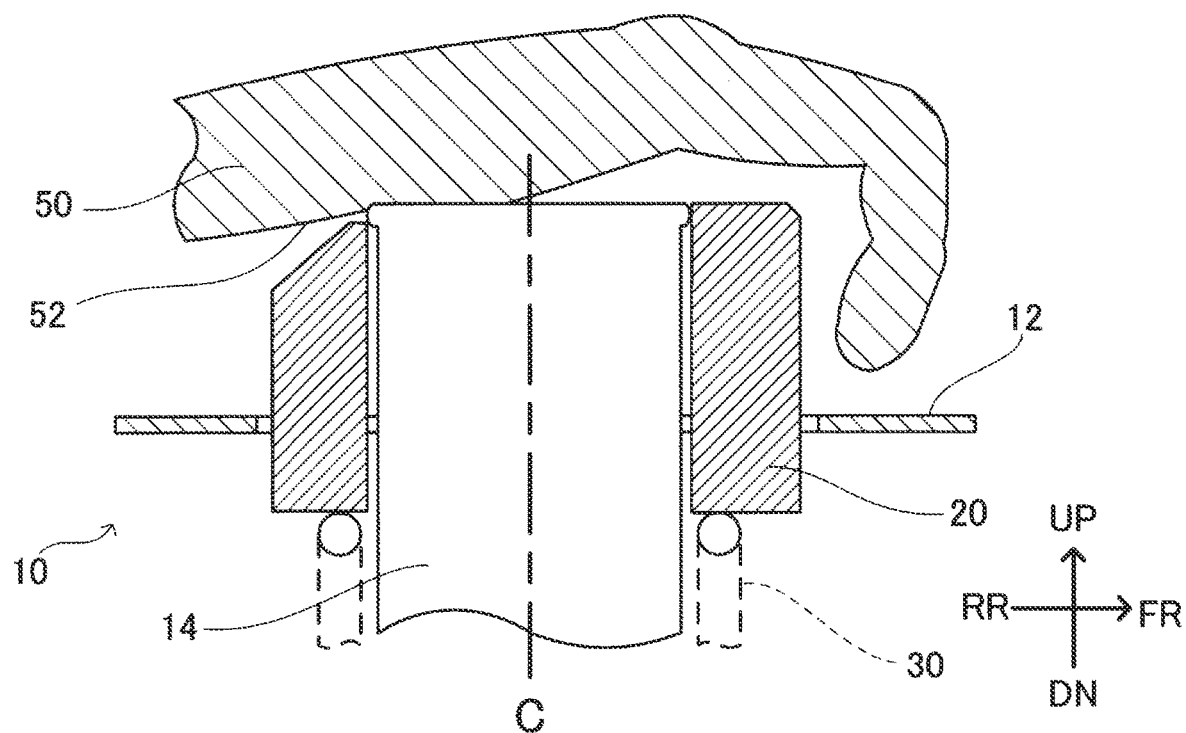
FIG. 5 is a diagram exemplifying a positional relation between the dial member 20 at the initial position and a hand 50 of a user, placed on the selector unit 10.

As described above, the selector unit 10 operated by the user (the driver here) is normally situated forward in the vehicle 2 as compared to the user. According to such a position, when the user places the hand 50 on the selector unit 10, a palm 52 (particularly, the ball of the little finger and the wrist) of the user may unintentionally come into contact with the dial member 20, as illustrated in FIG. 5. The portion that the palm 52 of the user primarily comes into contact with at this time is the rear-side upper face 20a of the dial member 20 that is situated at the user side. Accordingly, the above-described offset angle $\theta 1$ is relatively great for the rear-side upper face 20a of the dial member 20 even when the dial member 20 is at the initial position. Accordingly, the palm 52 of the user can be restrained from unintentionally coming into contact with the dial member 20. That is to say, erroneous operation of the dial member 20 can be suppressed.

Figure 6:
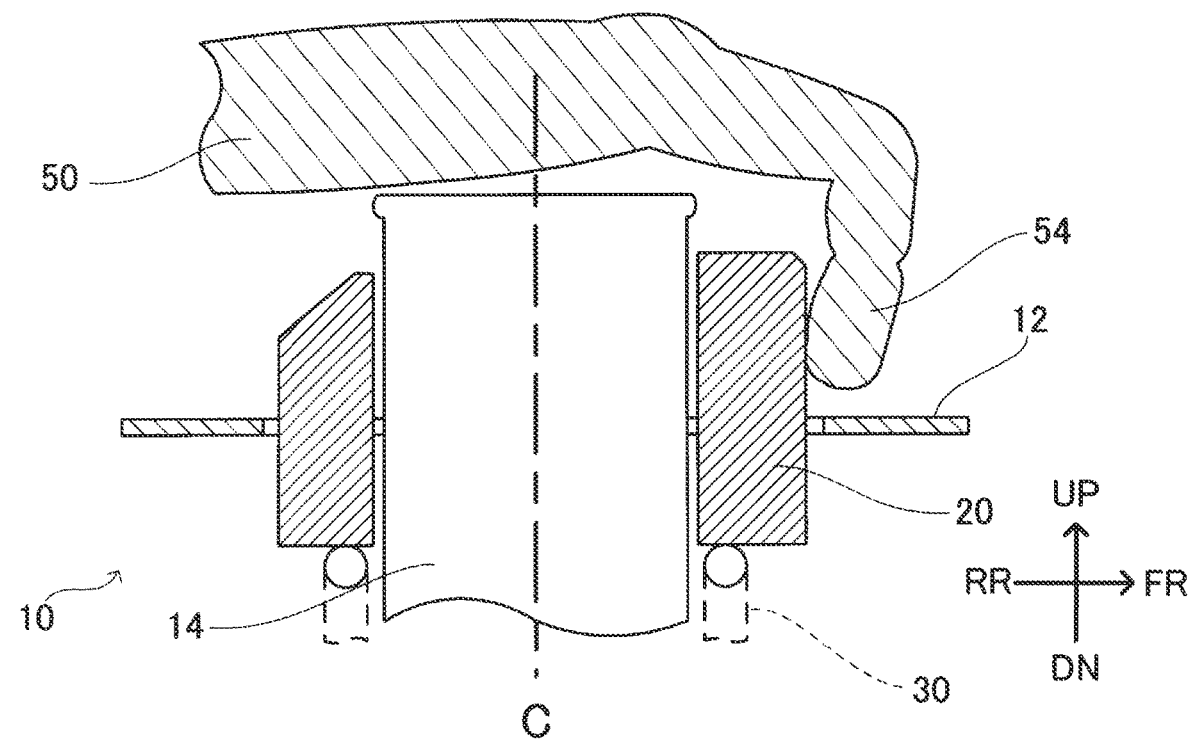
FIG. 6 is a diagram exemplifying a positional relation between the dial member 20 at the depressed position and a fingertip 54 of the user operating the dial member 20.

On the other hand, when the user intentionally operates the selector unit 10, the user often operates the dial member 20 using the fingertip 54, as illustrated in FIG. 6. At this time, the portion that the fingertip 54 of the user primarily comes into contact with is the portion of the dial member 20 that is situated on the opposite side from the user, i.e., the portion situated at the forward side in the vehicle 2. With regard to this point, an inclination such as that of the rear-side upper face 20a is not provided at the front-side upper face 20b of the dial member 20, and the above-described offset angle $\theta 2$ is relatively small even when the dial member 20 is at the depressed position. Accordingly, the height of the dial member 20 protruding from the panel 12 is maintained at the portion situated at the forward side in the vehicle 2 even when the dial member 20 is at the depressed position, and accordingly the user can easily operate the dial member 20 by the fingertip 54. That is to say, operability of the dial member 20 can be improved.

As described above, with the selector unit 10 according to the present embodiment, the upper faces 20a and 20b of the dial member 20 satisfy the magnitude relation of the above-described offset angles θ1 and θ2, and accordingly both improved operability and suppression of erroneous operations are realized. In particular, the rear-side upper face 20a of the dial member 20 is inclined such that a distance between the upper face 20a of the dial member 20 and the extended line EX shown in FIGS. 3 and 4 increases in a direction outward away from the protruding portion 14 in the radial direction, i.e., the distance between the upper face 20a and the extended line EX increases toward an outer side in the radial direction of the protruding portion 14. According to this configuration, unintentional contact of the palm 52 of the user with the dial member 20 can be suppressed more effectively.

The magnitude of an inclination angle θ3 of the rear-side upper face 20a (see FIG. 4) is not limited in particular. Note however, that when the inclination angle θ3 of the rear-side upper face 20a is equal to or greater than the offset angle θ1 of the same rear-side upper face 20a, unintentional contact of the palm 52 of the user with the dial member 20 can be suppressed more effectively. More specifically, the inclination angle θ3 at the rearward side in the vehicle front-rear direction may be equal to or greater than the offset angle at the rearward side in the vehicle front-rear direction when the dial member is at the depressed position. Note that the inclination angle θ3 here means the angle formed between the extended line EX obtained by extending the upper face 14a of the protruding portion 14 outwards in the radial direction, and the upper faces 20a, 20b of the dial member 20, in the section shown in FIG. 4.

An inclination angle θ3 such as described above can also be provided for the front-side upper face 20b of the dial member 20. However, in the selector unit 10 according to the present embodiment, the front-side upper face 20b of the dial member 20 has a flat face parallel to the extended line EX obtained by extending the upper face 14a of the protruding portion 14 outwards in the radial direction, as illustrated in FIGS. 3 and 4. According to this configuration, the operability of the selector unit 10 can be further improved by raising the height of the outer peripheral face of the dial member 20 at the forward side in the vehicle 2.

Although embodiments of the present disclosure have been described above in detail, these are only exemplifications, and do not limit the claims. The technology set forth in the claims includes various modifications and alterations of the specific example exemplified above. Technical elements described in the present disclosure or the drawings exhibit technical utility, either singularly or through various combinations, and are not limited by combinations set forth in the claims at the time of application. Also, the technology exemplified in the present disclosure or the drawings may achieve a plurality of objectives simultaneously, and achieving one of these objectives itself has technical utility.

What is claimed is:

1. A selector unit, the selector unit being a dial selector unit installed in a vehicle, the selector unit comprising:
    a protruding portion that protrudes inward into a vehicle cabin of the vehicle; and
    a dial member that is positioned on an outer side of the protruding portion in a radial direction, and that surrounds the protruding portion in a circumferential direction, wherein:
    the dial member is configured to be displaced between an initial position and a depressed position along an axial direction of the protruding portion, and to be rotationally operable in the circumferential direction when depressed to the depressed position; and
    wherein a first offset angle is defined as an angle between an extended line obtained by extending an upper face of the protruding portion in the radial direction and a tangential line that is in contact with both a rearward outer perimeter in a vehicle front-rear direction of the upper face of the protruding portion and a rearward outer perimeter in the vehicle front-rear direction of an upper face of the dial member when the dial member is at the initial position, in a section of the dial member and the protruding portion where a plane containing the rotation axis of the dial member passes through,
    wherein a second offset angle is defined as an angle between the extended line and a tangential line that is in contact with both a frontward outer perimeter in the vehicle front-rear direction of the upper face of the protruding portion and a frontward outer perimeter in the vehicle front-rear direction of the upper face of the dial member when the dial member is at the depressed position,
    wherein the first offset angle is greater than the second offset angle.

2. The selector unit according to claim 1, wherein, in the section, the upper face of the dial member situated at the rearward side in the vehicle front-rear direction inclines such that a distance between the upper face of the dial member and the extended line increases toward a radially outer side of the dial member.

3. The selector unit according to claim 2, wherein, when an inclination angle is defined as an angle between the extended line and the upper face of the dial member in the section, the inclination angle at the rearward side in the vehicle front-rear direction is equal to or greater than the first offset angle.

4. The selector unit according to claim 3, wherein a third offset angle is defined as an angle between the extended line and the tangential line that is in contact with both the rearward outer perimeter in the vehicle front-rear direction of the upper face of the protruding portion and the rearward outer perimeter in the vehicle front-rear direction of the upper face of the dial member when the dial member is at the depressed position,
    wherein the inclination angle at the rearward side in the vehicle front-rear direction is equal to or greater than the third offset angle.

5. The selector unit according to claim 1, wherein, in the section, the upper face of the dial member situated at the forward side in the vehicle front-rear direction has a flat face parallel to the extended line.

6. The selector unit according to claim 1, further comprising at least one biasing member that biases the dial member toward the initial position.

7. The selector unit according to claim 1, wherein the selector unit is a selector unit that is operated by a driver of the vehicle, and that is disposed forward of the driver in the vehicle front-rear direction.

8. The selector unit according to claim 7, wherein the selector unit is disposed in a center console of the vehicle.

9. The selector unit according to claim 1, wherein the offset angle is an angle between the extended line and the tangential line that is in contact with both a perimeter of the upper face of the protruding portion and a perimeter of the upper face of the dial member.

\* \* \* \* \*